Patented Jan. 19, 1932

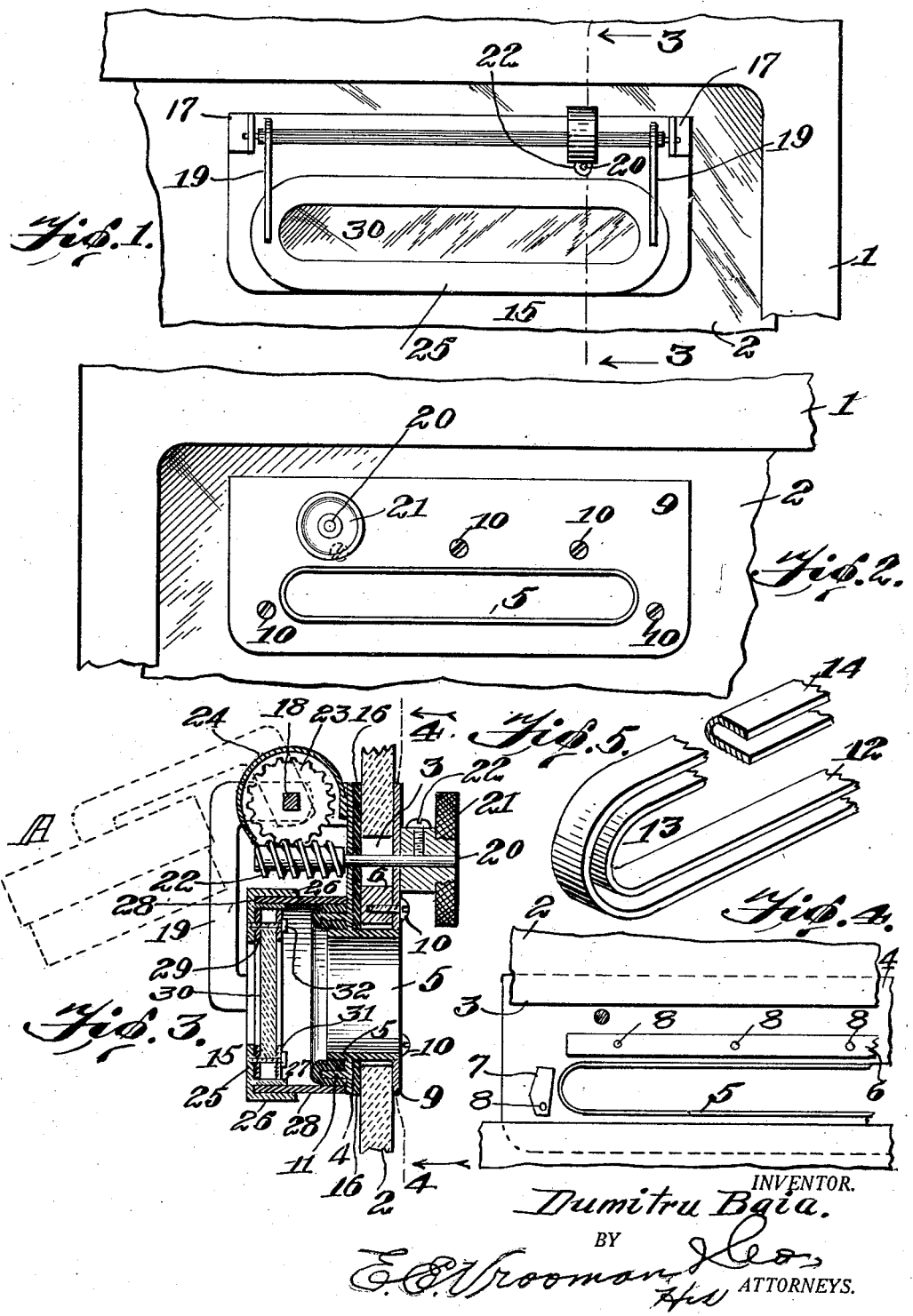

1,842,005

UNITED STATES PATENT OFFICE

DUMITRU BAIA, OF AURORA, ILLINOIS

SAFETY WINDOW FOR AUTOMOBILES, AIRPLANES, STREET CARS, ETC.

Application filed December 3, 1930. Serial No. 499,810.

This invention relates to a safety window for automobiles, street cars, airplanes, etc.

An object of my invention is the provision of simple and efficient means for permitting the operator of a motor vehicle of the classes above mentioned, to have a clear and unobstructed view when the "windshield" is covered with sleet, snow or ice.

Another object of my invention is the production of a window device for normally closing a "window" or sight opening formed in a glass windshield, or the like, which device comprises a minimum number of parts that are efficiently assembled, and easy to operate for accomplishing the desired result.

This new device is an improvement over my prior devices disclosed in my United States application, Ser. No. 460,508, "Safety window for automobiles, airplanes, street cars, etc."

With the foregoing and other objects in view, my invention comprises certain novel constructions, combinations and arrangements of parts as will be hereinafter fully described, illustrated in the accompanying drawings, and more particularly pointed out in the appended claims.

In the drawings:

Figure 1 is a view in front elevation of my device, while

Figure 2 is a rear view of the same.

Figure 3 is a sectional view taken on line 3—3, Figure 1, and looking in the direction of the arrows.

Figure 4 is a sectional view taken on line 4—4, Figure 3, and looking in the direction of the arrows.

Figure 5 is a fragmentary, perspective view of the rubber collar of my device.

Referring to the drawings by numerals, 1 designates the windshield and 2 is the glass thereof in which at any suitable point, I form an opening 3. I place an outer plate 4 against the outer face of glass 2. A large horizontal sleeve 5 is integral or soldered to the plate 4; this sleeve 5 extends through the plate 4 with said plate located at approximately the middle of the sleeve (Fig. 3). A spacing strip 6 is placed longitudinally of outer plate 4, against its inner face and is located in the opening 3 (Fig. 4); this facing strip is integral with or soldered to said plate. At opposite ends of sleeve 5 and fixedly secured to the inner face of outer plate 4 are spacing blocks 7 (Fig. 4). The facing strip 6 and block 7 are of the same width as the glass 2. Screw sockets 8 are formed in the spacing strip 6 and blocks 7. An inner plate 9 is placed against the inside of glass 2 with an opening therein for receiving the inner end of sleeve 5 (Fig. 3). Screws 10 extend through inner plate 9 and into said screw sockets 8 for detachably fastening the inner plate upon the windshield.

An encircling flange 11 (Fig. 3) is integral with outer plate 4 and is spaced a slight distance from sleeve 5, whereby a pocket is formed between sleeve 5 and flange 11 for receiving the inner portion 12 (Fig. 5) of the rubber collar 13; said collar 13 is substantially U-shape in cross section. The outer portion 14 of said rubber collar 13 extends down against the outer face of encircling flange 11, whereby water is prevented from seeping into the automobile, besides making a tight fit for the cover device 15 hereinafter described. A sheet-like piece of rubber 16 is placed between the glass 2 and the outer plate 4 (Fig. 3), for making an efficient connection or assembling, against the glass.

I securely fasten to the front face of outer plate 4, at the top edge, angle brackets 17 (Fig. 1). Journalled in the outer end of these brackets 17 is a horizontal shaft 18, which is preferably square in cross section, and secured to this shaft, are two outwardly extending arms 19. Carried by these angular arms 19 is the cover device 15; said cover device 15 is fixedly secured to said arm 19, so that when the shaft 18 is rotated, the cover device will be opened and closed. In Figure 3, in full lines, the cover device is shown in a closed position, but it is shown by dotted lines "A" in an open position. A transverse shaft 20 extends through inner plate 9, opening 3, rubber strip 16 and outer plate 4. A grip wheel 21 is fastened by screw 22 upon the inner end of shaft 20, so that when the operator rotates grip wheel 21 the worm 22, carried by the inner end of shaft 20, will rotate the meshing gear wheel 23, carried by shaft 18, whereby rotary movement will be imparted to said shaft 18. It is to be noted that the inner end of the worm 22 abuts against the outer plate 4 preventing the shaft 20 and worm 22 from being displaced off the device in one direction, whereas the grip wheel 21 keeps shaft 20 from being displaced in the opposite direction.

A gear casing 24 surrounds gear wheel 23 to protect the same from weather and to prevent any foreign substance such as a rag used in cleaning the windshield from catching in the same. This gear casing 24 is preferably a piece of material rolled around part of the gear wheel (Fig. 3) and soldered at its inner end to the outer face of the outer plate 4.

The cover device 15 comprises an outer casing 25 having a marginal flange 26 and an inner flange 27; these two flanges 26 and 27 are spaced apart and produce a circular-like pocket in which a circular-like piece of rubber 28 extends. This rubber 28 closes against the outer plate 4 and engages the outer portion 14 of the rubber collar 13 as clearly shown in Figure 3, whereby a very tight joint or closure is produced, permitting no rain, sleet, snow, etc. to enter the automobile when the cover device is in a closed position (Fig. 3). A rubber filling strip 29 is placed against the inside of the casing 25 and a glass 30 is placed against strip 29 with an oval-like fastening plate 31 against glass 30. Screws 32 extend through plate 31, rubber strip 29 and into casing 25 fastening the parts together.

It is to be understood that my device can be placed anywhere on the glass of an ordinary windshild according to the build of the car. The installation of the safety window could be right above the visible line in front of the operator, and can be built smaller or larger according to the make of the car.

It is to be understood that the glass 2 of windshield 1 constitutes a support, with an opening 3 therein. Further that the opening receives a casing structure for efficiently fastening the device to the support, and that there is a cover device employed operated by gear means for opening and closing said cover device. Of course, these units are illustrated in the accompanying drawings in a novel manner, which is my specific invention, but I reserve the right to use the broad above specified terms in some of the following claims.

While I have described the preferred embodiment of my invention and illustrated the same in the accompanying drawings, certain minor changes or alterations may appear to one skilled in the art to which this invention relates, during the extensive manufacture of the same, and I, therefore, reserve the right to make such changes or alterations as shall fairly fall within the scope of the appended claims.

What I claim is:

1. In a device of the class described, the combination of a casing structure, a cover device adapted to close against said casing structure, said cover device comprising an outer casing having a pocket-like structure, an encircling piece of rubber in said pocket-like structure and extending beyond the inner edge of said outer casing, and said casing structure provided with means connected to said cover device for opening and closing the same upon the casing structure.

2. In a device of the class described, the combination of a casing structure, a cover device adapted to close against said casing structure, said cover device comprising an outer casing having a marginal flange, said outer casing provided also with a flange spaced from said marginal flange, a rubber piece between said flanges and extending beyond their outer ends, a glass against said outer casing, a retaining plate within said outer casing and against said glass, screws extending through said retaining plate and into said outer casing for holding the parts together, and means on said casing structure for opening and closing said cover device.

3. In a device of the class described, the combination of an outer plate provided with a sleeve extending therethrough and also projecting beyond opposite sides of said plate, a longitudinally extending spacing strip and blocks fastened to the inner face of said outer plate, said spacing strip and blocks being of the same width as the inner extended portion of said sleeve, an inner plate on the inner end of said sleeve against said spacing strip and blocks, means fastening said inner plate to said spacing strip and blocks, a cover device hingedly mounted on said outer plate and normally closing the outer end of said sleeve, and manual means for opening and closing said cover device.

4. In a device of the class described, the combination of an outer plate provided with a sleeve, extending therethrough and also projecting beyond the inner and outer faces of said plate, a longitudinally extending spacing strip fastened above said sleeve to the inner face of said outer plate, spacing blocks fastened at the ends of said sleeve to the inner face of said outer plate, an inner plate having the sleeve extending therethrough and said plate placed against said spacing strip and blocks, screws extending through said inner plate and into said spacing strips and blocks, a cover device adapted to close one end of said sleeve, and manually operated means for opening and closing said cover device.

In testimony whereof I hereunto affix my signature.

DUMITRU BAIA.